US006669164B1

(12) United States Patent
Bohman

(10) Patent No.: US 6,669,164 B1
(45) Date of Patent: Dec. 30, 2003

(54) HOLDING DEVICE FOR MONITORS PROVIDED WITH VIEWING SCREENS

(76) Inventor: Gote Bohman, Tasta 8350, Hudiksvall S-82492 (SE)

( * ) Notice: Subject to any disclaimer, the term of this patent is extended or adjusted under 35 U.S.C. 154(b) by 0 days.

(21) Appl. No.: 10/203,474

(22) PCT Filed: Oct. 24, 2000

(86) PCT No.: PCT/SE00/02053
§ 371 (c)(1),
(2), (4) Date: Dec. 2, 2002

(87) PCT Pub. No.: WO01/61237
PCT Pub. Date: Aug. 23, 2001

(30) Foreign Application Priority Data

Feb. 15, 2000 (SE) .............................................. 0000467

(51) Int. Cl.⁷ .............................................. F16M 11/00
(52) U.S. Cl. ........................ 248/676; 248/393; 248/920; 248/923
(58) Field of Search .................................. 248/676, 133, 248/371, 372.1, 393, 395, 397, 398, 404, 162.1, 285.1, 286.1, 919, 920, 921, 922, 923

(56) References Cited

U.S. PATENT DOCUMENTS

| 4,706,920 A | * 11/1987 | Ojima et al. ................. 248/371 |
| 5,729,429 A | * 3/1998 | Margaritis et al. .......... 361/680 |
| 5,765,797 A | 6/1998 | Greene et al. .............. 248/398 |
| 6,491,276 B1 | * 12/2002 | Belliveau ................. 248/372.1 |

* cited by examiner

*Primary Examiner*—Ramon O. Ramirez
(74) *Attorney, Agent, or Firm*—Young & Thompson

(57) ABSTRACT

A holding device for monitors provided with displays comprises an underbody and a carrier located above it, on which carrier a monitor is applicable, the underbody and the carrier being interconnected via a mechanism that makes possible a readjustment of the monitor between different adjustment positions. This readjustment mechanism comprises such that when the carrier is manually pulled forwards/upwards relative to the underbody, the links will forcedly steer the carrier between a rear end position, in which the front end of the carrier is located near the underbody and the monitor display is oriented at a comparatively steep angle relative to a horizontal plane, and a front end position in which the carrier has been pivoted up and displaced translatorically relative to the underbody, at the same time as the display has obtained a flatter angle relative to the horizontal plane.

11 Claims, 5 Drawing Sheets

HOLDING DEVICE FOR MONITORS PROVIDED WITH VIEWING SCREENS

TECHNICAL FIELD OF THE INVENTION

Figure 1:
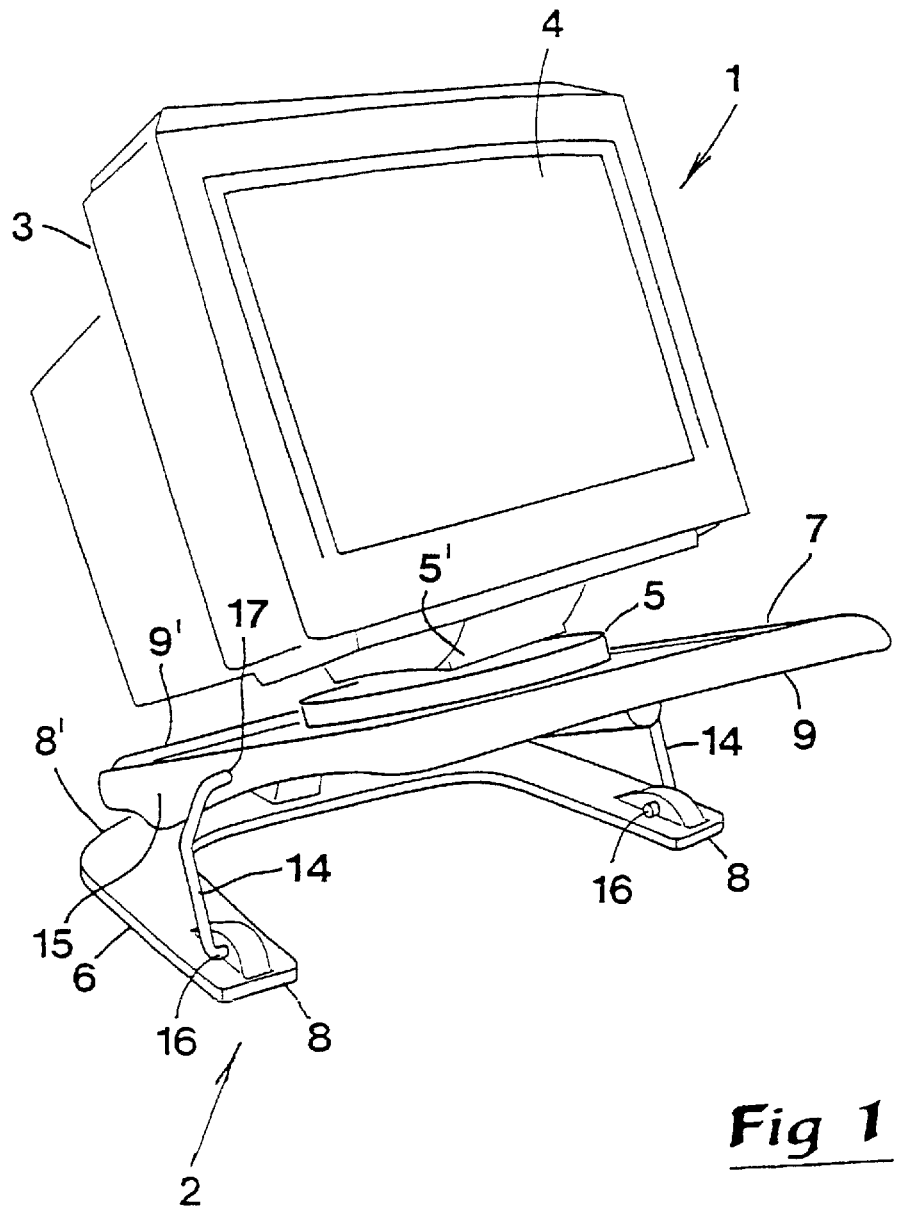

The present invention relates to a holding device intended for monitors provided with displays, which device comprises an underbody and a carrier located above said underbody, on which carrier a monitor is applicable, the underbody and the carrier—which have front and rear ends—being interconnected via a mechanism that makes possible a readjustment of the monitor between different adjustment positions, and that comprises at least one link, which is connected with the underbody via a first joint that is placed at a comparatively short distance from the front end of the underbody, and with the carrier via an opposed second joint that is placed at a larger distance from the front end of the carrier, and which link is so arranged as to, at manual movement of the carrier relative to the underbody, forcedly guide the carrier plate between a rear end position, in which the front end of the carrier is situated near the underbody and the display of the monitor is oriented at a comparatively steep angle relative to a horizontal plane, and a front end position in which the carrier is pivoted upwards/frontwards relative to the underbody, in order to locate the display of the monitor at a flatter angle relative to the horizontal plane.

BACKGROUND OF THE INVENTION

Working in computer offices is connected with ergonomical and physiological risks. In the long run people who work in a monotonous way during longer periods of time with a computer equipment placed on a desk or similar, accordingly run the risk of being affected by lesions in, e.g., wrists, arms and shoulders. A commonly occurring complaint in this context is the so-called mouse-arm. Lately, findings have appeared indicating that a better ergonomy is achieved if the work is performed with varying body postures, especially in that the operator alternately sits and stands during work. In this way, the body will inter alia utilize different muscle groups, primarily in connection with the handling of the control means of the computer and the manipulation of the different keys of the required keyboard.

In order to make possible working with a keyboard in a sitting body position as well as a standing body position, a keyboard holder has been developed that is the object of WO 98/23185. By means of this holder, the keyboard may quickly and easily be readjusted between a tipped-down, substantially horizontal state in which the keys and the control means may be manipulated in a sitting body position, and a tipped-up, angled state in which the same units may be manipulated in a standing body position with hanging arms, in which the arms and hands of the operator are to a large extent relaxed. By means of the keyboard holder disclosed in WO 98/23185, the problem with the keyboard work per se is solved in a satisfactory way. However, a problem arises with the monitor included in the computer equipment in connection with the changes of the operator between the sitting work position and the standing work position, more specifically due to the fact that not only the distance between the display of the monitor and the eyes of the operator, but also the angle between the display and the eyes is altered. Thus, in the sitting work position, the distance between the display and the eyes of the operator is comparatively short, at the same time as the display is adjusted at about right angles to the substantially horizontal sight-line of the eyes. When the operator gets up to the standing work position, the distance between the display and the eyes increases at the same time as the sight-line from the eyes downwards towards the display changes angles, more precisely in that the angle becomes smaller than 90°.

In order to solve the above-mentioned problems, different types of holding devices for monitors have previously been developed, having mechanisms that make possible a readjustment of the monitor between different adjustment positions. One type of such holding devices comprises a fastener and a carrier on which the monitor may be applied, and a pair of arms which via four joints are connected with the fastener and the carrier, respectively, in such a way that the carrier may be parallel-displaced vertically. In the construction is also included a spring that counterbalances the weight of the monitor in such a way that the monitor may be readjusted between different level positions and remain in given, desired positions as soon as the operator leaves hold of the monitor or its carrier. One example of this type of holding device is disclosed in GB 2 230 946. However, one disadvantage of such holding devices is that the display maintains its angle relative to the horizontal plane during the movement of the monitor between a lower end position and an upper end position. Another disadvantage is that the monitor in its upper end position is located at a rather high level above the appurtenant worktable; something that involves that the eye contact of the operator with the keyboard remaining on the worktable deteriorates.

A holding device of the type as defined in the preamble is previously disclosed in US 5 765 797. In this case, the underbody and a carrier plate for the monitor are interconnected via a central link, whose front end is connected to the underbody via a first joint placed near the front end of the underbody, and whose rear end is connected to the carrier plate via a second joint. At its rear end, the carrier plate is connected with the underbody via shaft, which at opposed ends is guided by side rails in the underbody and which serves as a third joint, around which the carrier plate may pivot, more specifically between a substantially horizontal tipped-down position and a position tipped up to about 50°. When pivoting the carrier plate from the tipped-down state to the tipped-up state, the rear edge of the carrier plate moves in a direction forwards along the underbody. The second joint that connects the carrier plate with the rear end of the link is placed about midway between the front and rear ends of the carrier plate, the length of the link, calculated as the distance between said first and second joints, being even somewhat larger than the distance between the second joint and the rear end of the carrier plate. In practice, this geometry of the known holder device brings about that the front edge of the carrier plate moves in an approximately vertical way from the tipped-down initial position to the tipped-up position, while the monitor moves upwards/backwards during the same manoeuvre. When the holding device is readjusted from the initial position, in which the user works in a sitting position, to the tipped-up position in order to permit working in a standing position, the distance between the user's eyes and the display of the monitor will therefore gradually increase. In other words, the users's conditions of working in an ergonomically purposeful way deteriorate when the carrier plate and the monitor are readjusted to the tipped-up state. Another disadvantage of the holding device according to U.S. Pat. No. 5,765,797 is that the fixed side rails require a deep building-in measure; something that renders the use of the holding device on shallow or narrow desks more difficult and requires an unnecessarily large surface on the desk.

OBJECTS AND CHARACTERISTICS OF THE INVENTION

The present invention aims at removing the above-mentioned disadvantages of the previously known holding devices for monitors and creating an improved holding device for the purpose of solving the operator's problems with the monitor in connection with the alterations between sitting and standing work positions. Therefore, a primary object of the invention is to create a holding device, which during readjustment maintains the distance between the display of the monitor and the eyes of the operator, as well as the angle between the display and the sight-line of the eyes substantially intact. Still another object of the invention is to create a structurallly simple holding device that is compact vertically as well as depth-wise and which, therefore, requires a minimum of installation space. In a particular aspect, the invention aims at creating a holding device that has a minimal contact surface against the worktable; all this in order to make possible an optimal utilization of the table surface for storage purposes. Yet another purpose of the invention is to create a holding device that makes possible a readjustment of the monitor between different adjustment positions in a comfortable, effort-saving way by means of one single manipulation.

FURTHER ELUCIDATION OF PRIOR ART

U.S. Pat. No. 4,706,920 discloses a holding device intended for monitors in the form of television sets, which device makes possible an angle readjustment of the monitor between a first end position, in which the display of the monitor is located near the vertical plane, i.e., is positioned at a steep angle relative to the horizontal plane, and a second end position, in which the angle to the vertical plane is larger. However, in this case the monitor moves backwards from its first end position towards its opposed end position; something that acts against its own purpose, since the distance between the display and the eyes of an observer increases when the obliquity angle of the display increases.

JP 111 49 255 discloses a device by means of which a monitor may be turned up to an active vertical position from a tipped-down, lying position. However, in this case the monitor is distanced from the observer when turning it up.

BRIEF DESCRIPTION OF THE APPENDED DRAWINGS

Figure 2:
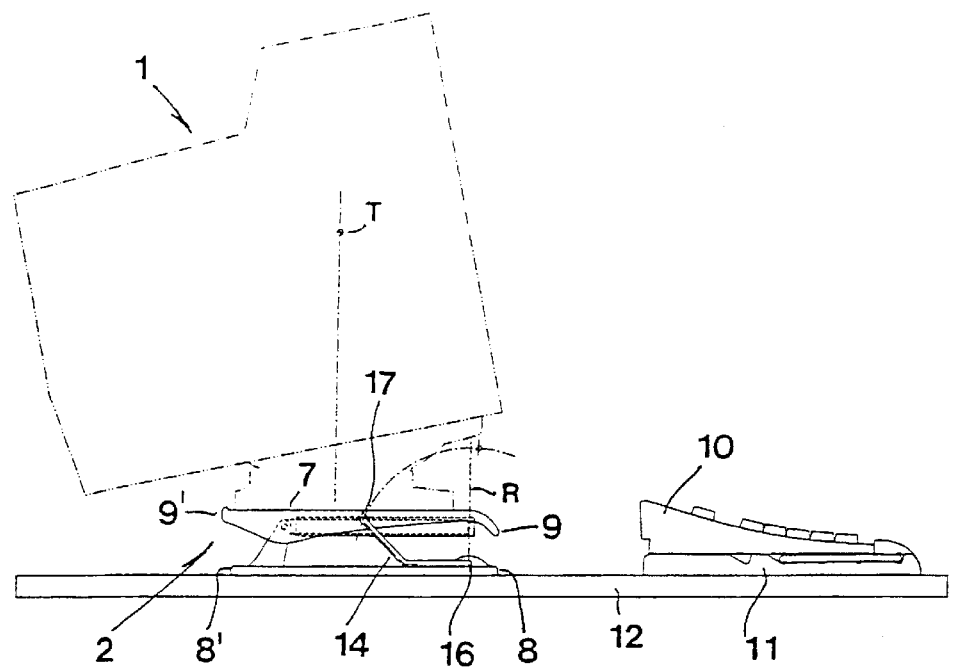
Figure 3:
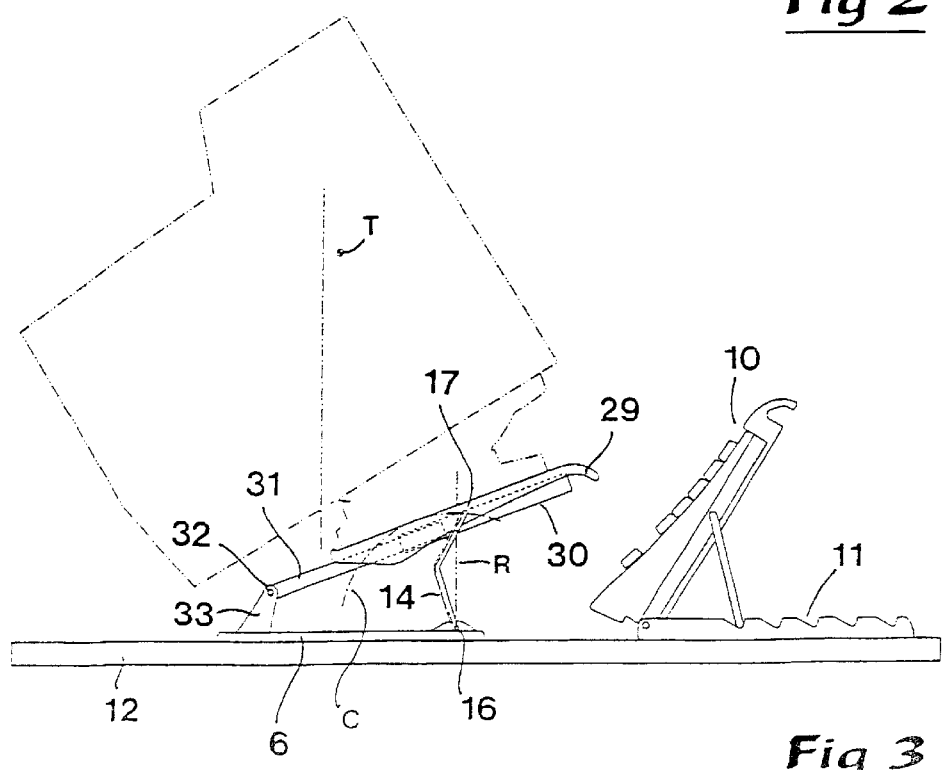
Figure 4:
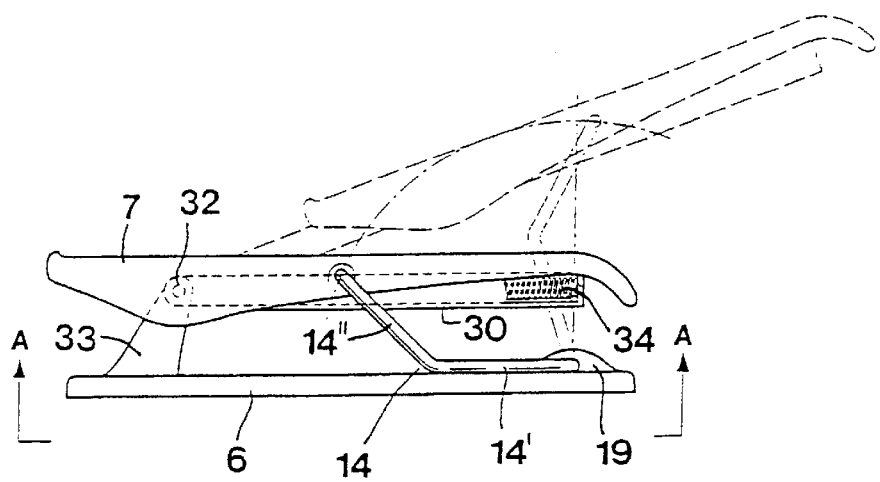
Figure 5:
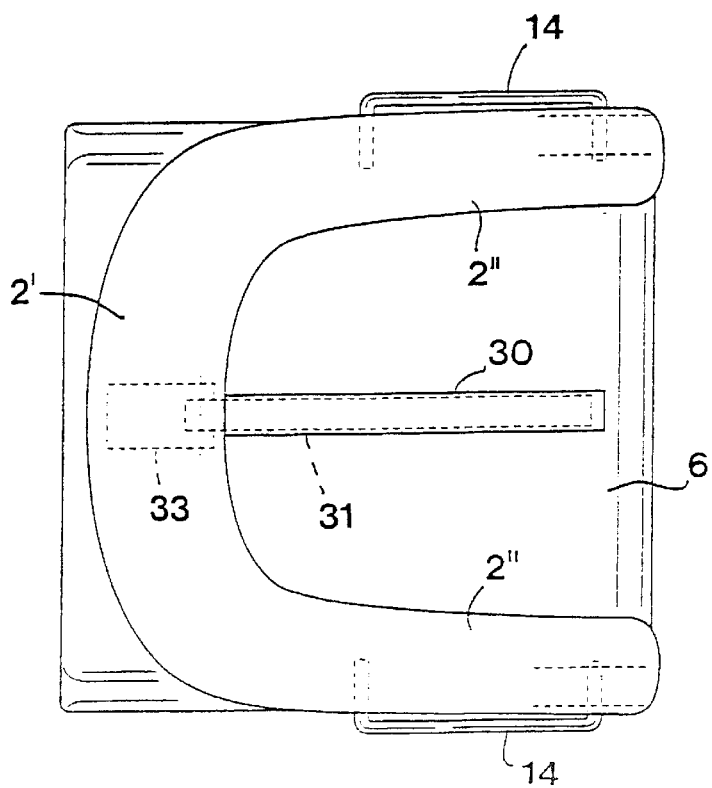
Figure 6:
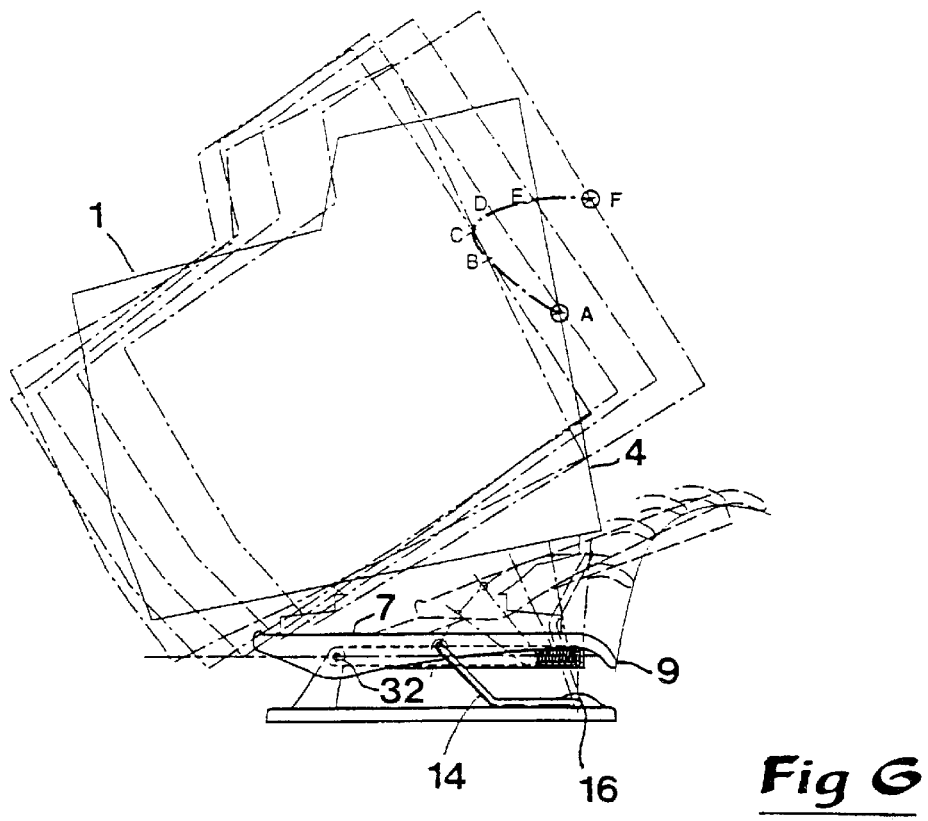
Figure 7:
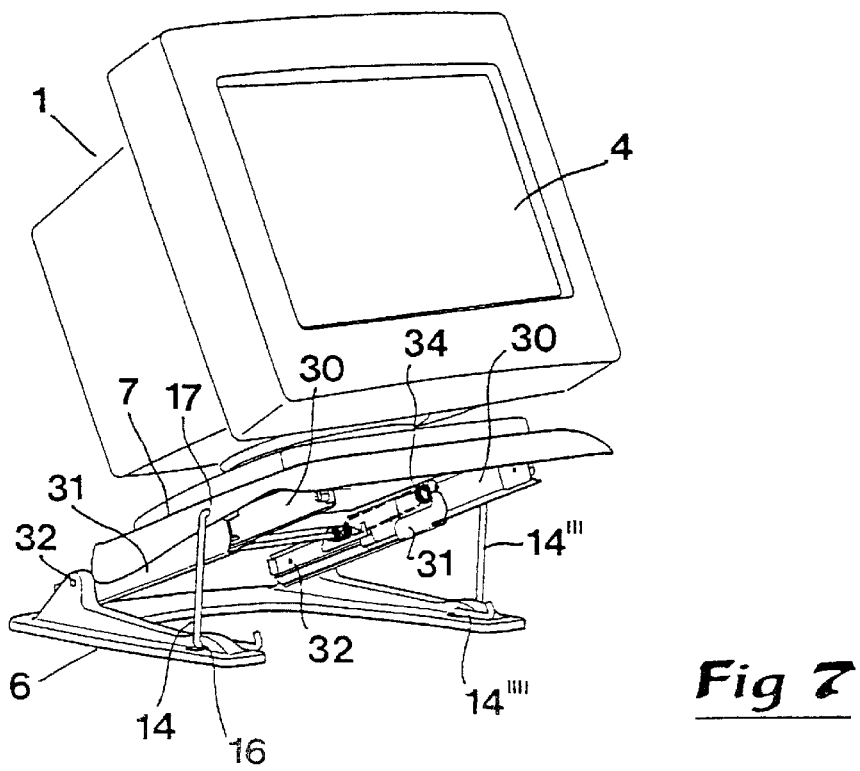
Figure 8:
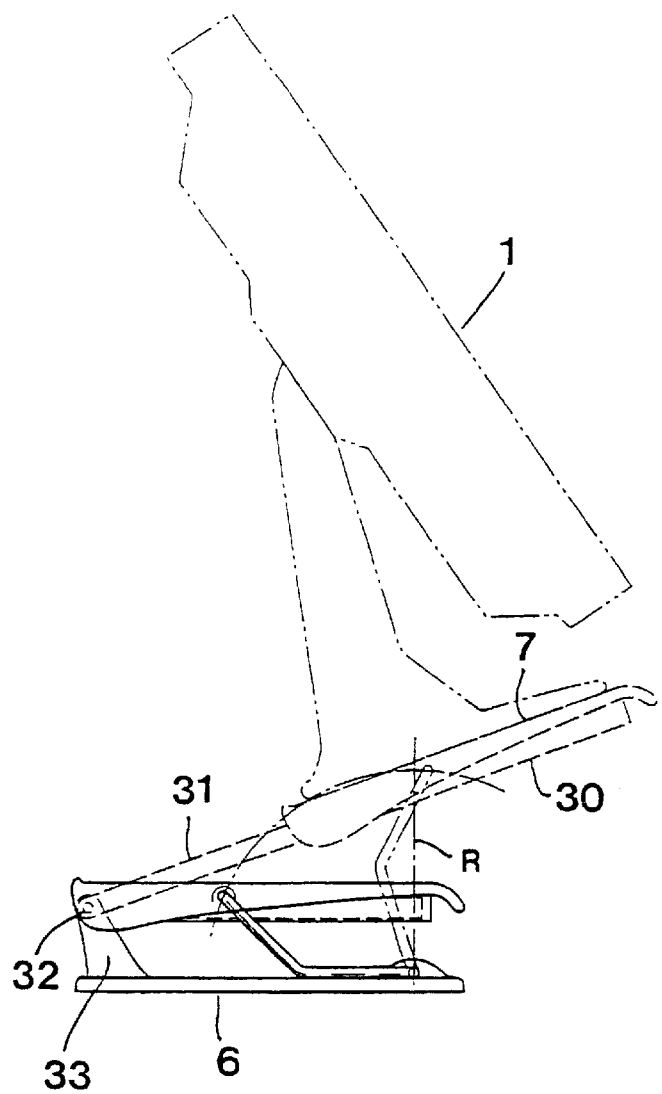
Figure 9:
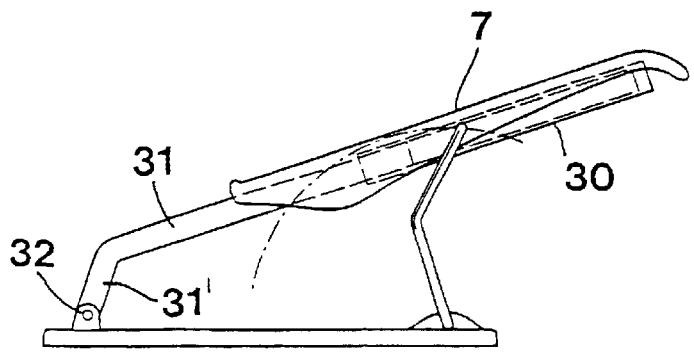

In the drawings:

FIG. 1 is a perspective view showing on one hand a holding device according to the invention, and on the other hand a monitor mounted on the carrier of the device, which monitor is illustrated in a tipped-up front end position, FIG. 2 is a side view illustrating the holding device and the monitor in a tipped-down rear end position, the holding device being shown on a base together with a tipped-down keyboard holder according to WO 98/23185, FIG. 3 is a corresponding side view showing the monitor as well as the keyboard holder in a tipped-up end position, FIG. 4 is a side view of the holding device according to the invention, FIG. 5 is a planar view (A—A in FIG. 4) from underneath of the holding device, FIG. 6 is a side view corresponding to FIG. 4, which illustrates the motion pattern of the monitor during its movement between the tipped-down and tipped-up end positions, FIG. 7 is a perspective view corresponding to FIG. 1 showing alternative embodiment of the holding device according to the invention, FIG. 8 is a side view of another alternative embodiment of a holding device intended for monitors of small depths, and FIG. 9 is a side view of still another alternative embodiment of the invention.

DETAILED DESCRIPTION OF PREFERRED EMBODIMENTS OF THE INVENTION

In FIG. 1 is shown on one hand a monitor 1 and on the other hand a holding device 2 according to the invention. The monitor that is intended for computers comprises an outer housing 3 and a display 4 in a front wall of the housing. The housing is mounted on a support 5 relative to which it is in a way known per se adjustable in different angles by means of an adjustment mechanism 5'.

The holding device 2 comprises an underbody or chassis 6 and a carrier in the form of a plate 7 located above said underbody. The underbody 6 may be applied as a loose unit on a base, e.g., a table. Front and rear edges on the underbody are designated 8 and 8', respectively, while analogous front and rear edges on the carrier plate 7 are designated 9 and 9', respectively. Advantageously, although not necessarily, the carrier plate 7 and the underbody 6 are of about the same size, whereby the carrier plate will cover the underbody in a tipped-down initial position.

Reference is now also made to FIGS. 2 and 3, in which is shown a keyboard 10 that is included in the same computer equipment as the monitor 1 and that is applied to a holder 11 of the type disclosed in WO 98/23185. By means of this holder 11, the keyboard may be readjusted between a tipped-down, substantially horizontal state in accordance with FIG. 2, and a tipped-up, comparatively steeply sloping state in accordance with FIG. 3.

In the holding device 2 is included a mechanism that makes possible a readjustment of the monitor not only between the two end positions that are shown in FIGS. 2 and 3, but also in arbitrary intermediate positions therebetween. This mechanism comprises two links 14, which according to the example are connected to opposed side pieces 15 of the carrier plate 7. More specifically, each such link 14 is connected with the underbody 6 via a first joint 16 and with the carrier plate 7 via an opposed, second joint 17. Each first joint 16 is placed relatively close to the front edge 8 of the underbody 6, while the second joint 17 of each link is located at a larger distance from the front edge 9 of the carrier plate 7. An imaginary reference plane designated R extends vertically through the geometrical center axis of the joints 16.

As may be seen in FIGS. 2 to 5, a guide 30 is provided on the underside of the carrier plate 7, with which guide cooperates an arm 31 (see FIG. 3), that is connected with the underbody 6 via a joint 32. In the example according to FIGS. 1 to 6, this joint 32 is located at a certain level above the underbody 6 by being placed at an upper end of a post 33 protruding from the rear part of the underbody. The guide 30 consists of a tube or box profile that is open at its back, into which tube or box profile a second box profile 31 serving as an arm is introduced. Between the guide 30 and the arm 31 acts a spring 34 that always endeavours to push the guide 30 in a direction forwards relative to the arm. The spring, which in the example according to FIGS. 1 to 6 consists of a compression spring, is selected so that it counterbalances the force of gravity that the monitor exerts on the carrier plate.

In the embodiment according to FIGS. 1 to 6, the carrier plate 7 is comparatively deep by the fact that its rear end portion protrudes a bit backwards from the joint 32. In this way, the carrier plate is suitable for accomodating a deep monitor, as illustrated in FIGS. 2 and 3. The links 14 are V-shaped in so far as they comprise two legs 14', 14" oriented at an obtuse angle relative to each other. One of these legs, namely the leg 14', bears against the underbody 6 in the initial position according to FIG. 4.

As may be seen in the view of FIG. 5, which is a view as seen from underneath, the underbody 6 is substantially U-shaped. Hence, from a rear, smoothly rounded part 2' extend two forwardly directed parts 2", which are separated and substantially parallel. Between these two parts 2" is obtained, on the table on which the device is mounted, a free space that may be utilized for storage purposes in general, e.g., for the storage of paper, pens or other office appliances.

By a comparison between FIGS. 2 and 3, it may be seen how the center of gravity T of the monitor 1 moves extremely little in the horizontal plane during the displacement of the monitor between its two end positions. Further, it should be noted that the joint 32 between the arm 31 and the post 33 in bath cases is located near the center of gravity T. This implies that the manual force required for moving the monitor becomes moderate.

FUNCTION AND ADVANTAGES OF THE INVENTION

Initially, the monitor is applied upon the carrier plate 7 with its display adjusted to an individual, desired angle position relative to the support 5. In the normal case, this involves that the angle of the display 4 relative to the horizontal plane is comparatively steep. Thus, in the example according to FIG. 2, the angle amounts to about 80°. In order to eliminate the risk of tipping, the monitor may be secured to the carrier plate 7 by means of a securing means (not shown).

In FIG. 2, the monitor is adjusted for a sitting work position. In this state, the keyboard 10 is oriented substantially horizontally.

When the operator wishes to work in a standing position, not only the keyboard 10 is readjusted in the previously known way, but also the monitor 1, in the way as illustrated in FIG. 3. In order to tip up the monitor to the position shown in FIG. 3, the operator grips a handle 29 arranged at the front edge of the carrier plate, and applies a pulling force to the carrier plate, which force is directed forwards and slightly upwards. This initiates a displacement motion during which the carrier plate 7 on one hand moves translatorically in a direction forwards along the arm 31, and on the other hand pivots with its front edge in a direction obliquely upwards/forwards. More precisely, the two links 14 will forcedly steer the motion of the carrier plate by the fact that the upper joints 17 of the links are forced to move in a circular path C around the joint 16 (see FIG. 3). By the fact that the spring force in the spring 34 in the main counterbalances the force of gravity that the monitor exerts on the carrier plate 7, the manual force required for the displacement will become minimal. When the carrier plate is moved all the way from its horizontal initial position according to FIG. 2 to the tipped-up end position according to FIG. 3, then the upper joints 17 of the links will pass the vertical reference plane R through the joints 16 (see FIG. 3), whereby the weight of the monitor will act to keep the carrier plate in an end position which inter alia is determined by the length of the arm 31. By adjusting the effective length of the spring 34 in a suitable way, it is also possible to adjust the carrier plate and the monitor into different intermediate positions between the initial position and the front end position. Hence, when the force and the length of the spring, respectively, and the force of gravity of the monitor are chosen in a suitable way, the forces may be balanced in such a way that any friction occurring in the construction is sufficient for keeping the carrier plate in arbitrary positions between the end positions.

When the monitor is moved to its tipped-up end position according to FIG. 3, the display 4 obtains a considerably smaller or flatter angle relative to the horizontal plane than in the initial position. Thus, in the position according to FIG. 3, the display is obliquely positioned at about 60° to the horizontal plane. In this end position, the display 4 has not only been obliquely positioned in such a way that the sight-line of the standing operator maintains its approximately right angle to the display, but also the distance between the display and the eyes has been substantially maintained, in that the display has been moved forwards as well as upwards in relation to the initial position. However, at the same time, the level of the display as such above the table 12 has been only moderately increased, which involves that the eye contact of the operator with the keyboard 10 does not deteriorate.

In FIG. 6, the motion patterns of the carrier plate 7 and the monitor 1 are illustrated during displacement between their end positions. In the figure may be seen how the front edge 9 of the carrier plate 7 moves in an arched path obliquely upwards/forwards from a lower initial position, at the same time as a point in the middle of the display 4 of the monitor moves in a partly elliptic path. From a lower initial position A said middle point first moves in a direction obliquely upwards/backwards and thereafter it transposes into a forwardly directed arch part, along which the end position F is located at a considerable distance from the initial position A. By its translatorical motion relative to the pivotable arm 31, the carrier plate 7 may be said to rise at its front edge when pulling it.

Another important advantage of the holding device according to the invention is that it guarantees that the display of the monitor keeps the desired distance and angular position relative to the eyes of the operator, in a sitting as well as standing work position, independently of the tallness of the operator. Thus, a short person individually adjusts the position of the display into a relatively steep, approximately right angle to the carrier plate 7 by means of the own adjustment mechanism 5' of the monitor in order to obtain an optimal readability in a sitting position. When the monitor is readjusted for work in a standing position, the angle as well as the distance relative to the eyes are maintained. A taller operator adjusts the display to a flatter angle relative to the support 5 and the carrier plate 7 in order to obtain the best possible readability. When the tall operator readjusts the monitor for work in a standing position, then the initially adjusted angle as well as the distance between the display and the eyes are still maintained.

Yet another advantage of the invention is that the telescopical function that is achieved by the carrier plate being able to move translatorically relative to the pivotable arm, results in a desirably short length of construction of the holding device in the tipped-down initial position of the carrier plate.

Reference is now made to FIG. 7, which illustrates an alternative embodiment of the holding device according to the invention. In this case, the holding device comprises two guides or guide-like parts 30 and two pivotable arms 31 that are connected with the underbody 6 via laterally separated joints 32. Here, the pairs of guides and pivot arms 30, 31 are arranged in the immediate proximity of the side pieces of the carrier plate 7. Between each guide and arm acts a spring 34 in the form of a draw spring that always endeavours to separate the arm 31 and the carrier plate 7 telescopically in a direction forwards.

Contrary to the V-shaped links 14 of the embodiment according to FIGS. 1 to 6, the links in the embodiment according to FIG. 7 are substantially L-shaped. Thus, each link comprises on one hand a long, straight leg 14''' that extends between the joints 16 and 17, and on the other hand a short, equally straight leg 14''''. The short legs 14'''' of the links serve as stops for the upper end position and as front supports and stops for the carrier plate 7 in its horizontal initial position.

In FIG. 8, still another alternative embodiment of the holding device is shown, which is particularly suited for monitors of small depth and small weight. Therefore, in this case, the device may be made with a carrier plate 7 that has a minimal depth. Then, the carrier plate is connected with the joint 32 in immediate proximity to the rear end of the plate, the post 33 extending obliquely upwards and backwards from the rear end of the underbody 6, instead of obliquely upwards and forwards, as in the case of the embodiment according to FIGS. 1 to 6.

In FIG. 9 is shown an embodiment, in which the arm 31 is angle-shaped. More precisely, the arm has a rear portion 31' that is bent at an angle, e.g., an obtuse angle to the arm in general. In this way, the main part of the arm is held on a level above the underbody 6 without the joint 32 as such having to be mounted in any special post on the underbody.

FEASIBLE MODIFICATIONS OF THE INVENTION

The invention is not limited solely to the embodiments as described above and shown in the drawings. Although the invention is illustrated in the form of a loose unit that may be mounted anywhere on an arbitrary base, it is also feasible to integrate the device with, e.g., a table included in a computer work-station, whereby the existing table or its under-structure forms a firm part relative to which the carrier plate is movable. As a carrier for the monitor, one does not necessarily have to use a plane plate with bent-down side pieces, as shown in the drawings. Thus, the carrier may have the shape of a grating or similar. It is also feasible to construct the holding device according to the invention with pairs of guides and pivot arms that are placed at the side of the carrier instead of underneath the same, as illustrated in the drawings. In this case, the carrier may be shaped with upwardly bent side pieces, on whose outsides the pairs of guides and pivot arms are placed. One advantage with such an embodiment is that the carrier—and the monitor as well—may be located on the lowest feasible level in relation to the environment, e.g., a desk. In this context, it may also be mentioned that the device according to the invention may be used also for other monitors than computer monitors, e.g., television sets, counter terminals and similar. Finally, it is pointed out that the terms "guide" and "arm", respectively, as these are used in the preceding description and the following claims, should be interpreted in their widest sense and be considered to include all sorts of components that permit telescoping motions relative to each other and, thereby, translatorical motions of the carrier in the above described way.

What is claimed is:

1. A holding device for a monitor provided with a display, comprising:

an underbody and a carrier located above said underbody for supporting a monitor;

the underbody and the carrier having respective front and rear ends and being interconnected via a mechanism for readjusting the monitor between different adjustment positions;

said mechanism comprising at least one link connected to the underbody via a first joint positioned at a comparatively short distance from the front end of the underbody, and connected to the carrier via an opposed second joint positioned at a larger distance from the front end of the carrier;

said link being so arranged as to, at manual movement of the carrier relative to the underbody, forcedly guide the carrier between a rear end position in which the front end of the carrier is situated near the underbody, and the display of the monitor is oriented at a comparatively steep angle relative to a horizontal plane, and a second end position in which the carrier is pivoted upwards/frontwards relative to the underbody, in order to locate the display of the monitor at a flatter angle relative to the horizontal plane;

said carrier comprising at least one guide, which cooperates with a pivot arm connected to the underbody via a third joint located in the region of the rear end of the underbody, whereby the guide and the carrier are translatorically displaceable relative to the underbody.

2. The holding device according to claim 1, wherein the length of the link and its location relative to the underbody and the carrier are such that the second joint in its opposed end positions is located on one of the two sides of an imaginary vertical reference plane through the first joint.

3. The holding device according to claim 2, wherein the carrier is influenced by at least one spring that always endeavors to move the carrier in a forward direction relative to the pivot arm by a spring force that counterbalances the force of gravity exerted by the monitor.

4. The holding device according to claim 3, wherein the holding device comprises two links that are located on both sides of the carrier.

5. The holding device according to claim 2, wherein the holding device comprises two links that are located on both sides of the carrier.

6. The holding device according to claim 1, wherein the carrier is influenced by at least one spring that always endeavors to move the carrier in a forward direction relative to the pivot arm by a spring force that counterbalances the force of gravity exerted by the monitor.

7. The holding device according to claim 6, wherein the holding device comprises two links that are located on both sides of the carrier.

8. The holding device according to claim 1, wherein the holding device comprises two links that are located on both sides of the carrier.

9. The holding device according to claim 8, wherein each link is V-shaped and comprises a leg articulatedly connected to the underbody; said leg functioning to bear against the underbody when the carrier has been moved to its rear end position relative to the pivot arm.

10. The holding device according to claim 8, wherein a pair of cooperating guides and pivot arms are located on both sides of the carrier.

11. The holding device according to claim 10, wherein the carrier is countersunk relative to the pairs of cooperating guides and pivot arms.

* * * * *